United States Patent

Yonezawa et al.

Patent Number: 5,296,995
Date of Patent: Mar. 22, 1994

[54] METHOD OF MAGNETICALLY RECORDING AND READING DATA, MAGNETIC RECORDING MEDIUM, ITS PRODUCTION METHOD AND MAGNETIC RECORDING APPARATUS

[75] Inventors: Seiji Yonezawa, Hachioji; Keiji Kataoka, Kawagoe; Hajime Fukke, Tama; Tsuneo Terasawa; Keizo Kato, both of Hachioji; Harukazu Miyamoto, Kodaira, all of Japan; Klaus Kinstätter, Bamberg, Fed. Rep. of Germany; Masaru Ito, Sagamihara; Norio Ohta, Iruma, both of Japan

[73] Assignee: Hitachi, Ltd., Tokyo, Japan

[21] Appl. No.: 549

[22] Filed: Jan. 4, 1993

Related U.S. Application Data

[63] Continuation of Ser. No. 462,565, Jan. 9, 1990, abandoned.

[30] Foreign Application Priority Data

| Jan. 11, 1989 | [JP] | Japan | 1-2736 |
| Jan. 30, 1989 | [JP] | Japan | 1-17633 |
| Feb. 13, 1989 | [JP] | Japan | 1-31034 |
| Feb. 20, 1989 | [JP] | Japan | 1-38220 |
| Mar. 15, 1989 | [JP] | Japan | 1-60967 |
| Apr. 24, 1989 | [JP] | Japan | 1-101623 |
| Jun. 19, 1989 | [JP] | Japan | 1-154570 |

[51] Int. Cl.$^5$ .................. G11B 9/02; G11B 9/08; B05D 1/32; G06K 19/06
[52] U.S. Cl. .................. 360/135; 360/55; 360/77.02; 360/77.03; 427/130; 427/264; 427/282; 235/493
[58] Field of Search .................. 360/77.03, 55, 131, 360/135, 77.02, 77.05; 235/493; 427/48, 130, 264, 282

[56] References Cited

U.S. PATENT DOCUMENTS

| 3,034,111 | 5/1962 | Hoagland et al. | 360/77.07 |
| 3,593,331 | 7/1971 | Connell et al. | 360/135 |
| 3,753,252 | 8/1973 | Tietze | 360/135 |
| 4,188,646 | 2/1980 | Sordello et al. | 360/77.08 |
| 4,746,580 | 5/1988 | Bishop et al. | 427/48 |
| 4,912,487 | 3/1990 | Porter et al. | 358/296 |
| 4,912,585 | 3/1990 | Belser et al. | 360/131 |
| 4,935,278 | 6/1990 | Krounbi et al. | 427/131 |
| 4,935,835 | 6/1990 | Godwin et al. | 360/135 |
| 4,961,123 | 10/1990 | Williams et al. | 360/77.03 |

*Primary Examiner*—David L. Robertson
*Attorney, Agent, or Firm*—Antonelli, Terry, Stout & Kraus

[57] ABSTRACT

The present invention uses a magnetic recording medium equipped with those magnetically readable recording servo pits which are preformed on a magnetic recording medium and have different magnetic characteristics from those of a recording magnetic film, detects magnetically a tracking signal or preformat signals such as sync signals, address signals, and the like, from the magnetic flux distribution (leakage magnetic field) occurring at edges of each of the servo pits using a magnetic head, makes servo control of the position of the magnetic head by the detected tracking signal and records or reads magnetically the data along the center of a track. In the magnetic recording medium of the present invention, magnetically readable, wobbled servo pits or sync pits, track address pits and data pits are preformed on the magnetic recording medium, these pit portions have locally different magnetic characteristics from those of the recording magnetic film and have a magnetic film structure wherein saturated magnetization is smaller than at other portions or the magnetic film is removed locally. These preformed pits can be read magnetically by detecting the local magnetic field (leakage magnetic field) generated at their edges by the magnetic head.

23 Claims, 16 Drawing Sheets

HEAD POSITION (A)

HEAD POSITION (B)

HEAD POSITION (C)

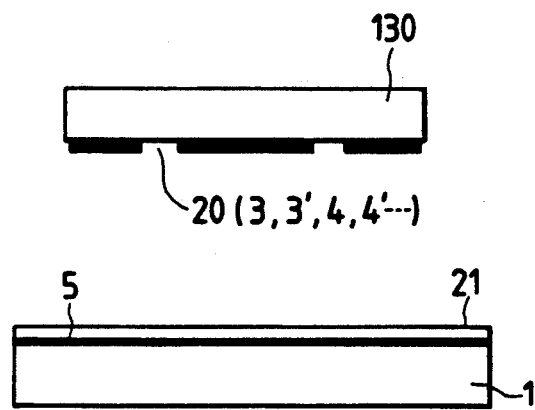
FIG. 17A
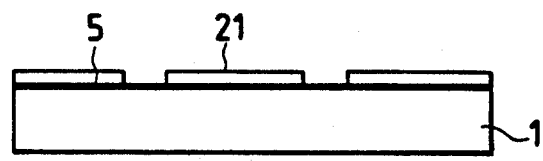
FIG. 17B
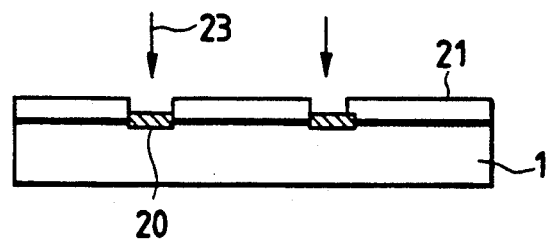
FIG. 17C
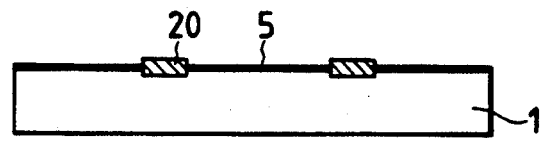
FIG. 17D
FIG. 19
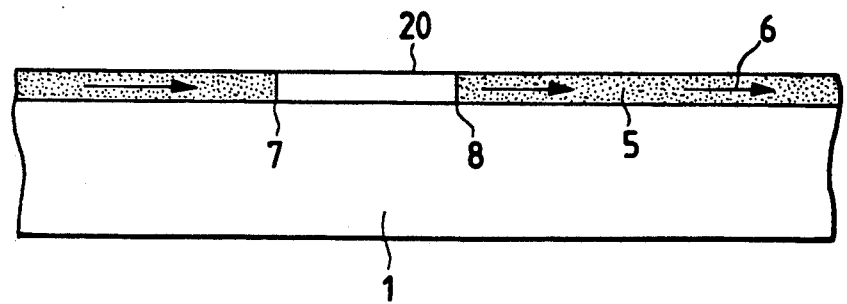

METHOD OF MAGNETICALLY RECORDING AND READING DATA, MAGNETIC RECORDING MEDIUM, ITS PRODUCTION METHOD AND MAGNETIC RECORDING APPARATUS

This application is a continuation of application Ser. No. 07/462,565, filed Jan. 9, 1990, now abandoned.

BACKGROUND OF THE INVENTION

This invention relates to a method of magnetically recording and reading data while a magnetic head is being subjected to tracking control, a magnetic recording medium used for the method, its production method and a magnetic recording apparatus for recording and reading the magnetic recording medium.

Tracking control has not been necessary in a conventional magnetic recording medium (magnetic disk) which records digital information by a magnetic head because a method has been employed which sufficiently reduces eccentricity of the magnetic recording medium to sufficiently increase a track width and improves accuracy of a mechanism portion of a magnetic recording apparatus to reduce a relative position error between the magnetic recording medium and the magnetic head. In a magnetic recording medium for recording digital data, a magnetic film is sputtered onto a disk substrate such as an aluminum substrate and initial magnetization is effected. Then, the disk is initialized one by one by a servo writer or the magnetic head of the magnetic recording apparatus.

In order to accomplish a higher recording density by reducing further a recording track width of a magnetic recording medium, machining accuracy of the magnetic recording medium and the mechanism portion of the magnetic recording apparatus must be improved but this results in the problems that productivity of the recording medium (magnetic disk) drops, ultra-high precision machining is necessary for the mechanical portion of the magnetic recording apparatus and the magnetic recording apparatus thus becomes too large in scale to achieve reasonable stability and cost.

Since it has not been possible conventionally to replicate in advance fixed information specific to a computer onto a magnetic disk, troublesome procedures of purchasing beforehand a software recorded on a floppy disk and then transferring the information from the floppy disk to a magnetic disk have been necessary to replicate a personal computer software. If the software is large in scale, the number of floppy disks reaches some dozens so that operability of the apparatus drops and a user cannot use it so easily. Moreover, the magnetic disk medium must be initialized one by one by a servo writer or a magnetic recording apparatus after a magnetic film is sputtered onto a disk substrate such as an aluminum substrate and is magnetized initially. Therefore, it has been difficult to replicate large quantities of magnetic disk media having recorded information.

On the other hand, in a magnetic disk (floppy) in which digital data are recorded by a magnetic head while optical tracking control is being made, there has been proposed a system which forms in advance a guide groove in a magnetic medium, guides optically the magnetic head by the aid of this guide groove and records data magnetically ("Nikkei Electronics", Sept. 5, 1988, No. 455).

SUMMARY OF THE INVENTION

It is an object of the present invention to provide a magnetic recording and reading method which makes high precision tracking control of a magnetic head by pre-forming servo pits capable of being detected magnetically on a magnetic recording medium and which makes it possible to record or read magnetically data at a high density and with a high level of reliability.

It is another object of the present invention to provide a magnetic recording medium which makes it possible to effect high precision tracking control of a magnetic head by pre-forming servo pits and data pits capable of being detected magnetically, and which can be replicated easily.

It is still another object of the present invention to provide a magnetic recording apparatus equipped with a tracking signal detection system capable of detecting magnetically a tracking signal by use of servo pits disposed in advance on a magnetic recording medium.

The present invention is characterized in that pre-format signals such as a tracking signal, a sync signal, an address signal, and the like, are detected magnetically by a magnetic head from a magnetic flux distribution (leakage magnetic field) occurring at the edges of servo pits by use of a magnetic recording medium equipped thereon with such servo pits which are pre-formed with different magnetic characteristics from those of the recording magnetic film and can be read magnetically, and the position of a magnetic head is servo-controlled by the detected tracking signal so as to record or read magnetically data along the center of a track.

In the magnetic recording medium of the present invention, wobbled servo pits, sync pits, track address pits and data pits that can be read magnetically are pre-formed on the magnetic recording medium and these pits have locally different magnetic characteristics from those of the magnetic recording film and have, for example, lower sturation magnetization than other portions.

According to one characterizing feature of the present invention, the preformed pits are formed by removing locally the recording magnetic film.

According to another characterizing feature of the present invention, the preformed pits are formed by removing locally the base film of the recording magnetic film.

These preformed pits can be read magnetically by detecting the local magnetic field (leakage magnetic field) generated at their edges by a magnetic head floating on the magnetic recording medium. For instance, the tracking servo pits which are disposed along a track with predetermined gaps between them are formed by at least one pair of pits preformed in a wobbling arrangement with respect to the track center and a tracking signal can be detected by comparing read signals obtained when the magnetic head passes the pair of the wobbled pits.

The magnetic recording medium of the present invention is characterized also in that it includes a first area (ROM area) where magnetically readable data are stored in advance and a second area (RAM area) where a user can record and read magnetically data. Though the data of the first area (ROM area) can be read magnetically, the data are replicable and this first area (ROM area) can be used suitably for recording the fixed information specific to an apparatus utilizing a software specific to a computer, or the like.

According to another characterizing feature of the present invention, the first area (ROM area) and the second area (RAM area) are divided by angles and co-exist in mixture. In the first area (ROM area), magnetically readable data (ROM data) are preformed with locally different magnetic characteristics from those of the recording magnetic film. A large number of servo marks which are preformed with locally different magnetic characteristics from those of the recording magnetic film and which can be read magnetically are disposed periodically along the track in this first area (ROM area), and the magnetically readable data (ROM data) described above are preformed between these servo marks.

In accordance with still another characterizing feature of the present invention, a large number of magnetically readable servo marks preformed with locally different magnetic characteristics from those of the recording magnetic film and which can be read magnetically are disposed periodically along the track in the second area (RAM area), too, and the portions between these servo marks are used as data recording areas where a user magnetically records data.

The present invention uses a magnetic recording medium equipped with servo pits which are preformed with locally different magnetic characteristics from those of the recording magnetic film as marks for detecting a tracking signal and detects the tracking signal from the localized magnetic field generated at the edges of these servo pits using a magnetic head floating on the magnetic recording medium. Accordingly, a tracking signal can be detected by the magnetic head alone with a high S/N, and moreover, the apparatus is compact in scale.

According to the present invention, the servo marks (servo pits) having different magnetic characteristics from those of the recording magnetic film are preformed and though these preformed pits can be detected magnetically, the recording medium of the invention is replicable. Therefore, a large number of the same magnetic recording media can be produced economically.

In accordance with the magnetic recording medium of the present invention, the recording medium has the first area (ROM area) where magnetically readable data are stored in advance and the second area (RAM area) where a user can record and read data magnetically. Therefore, if the fixed information specific to an apparatus utilizing a software specific to a computer is recorded in this first area (ROM area), it is not necessary for the user to magnetically copy a software program or the like from a floppy disk to a magnetic recording medium. Moreover, though the data of the first area (ROM area) is magnetically readable, it is replicable, too, so that large quantities of the magnetic recording media having the same preformed data (servo data, sync data, address data, ROM data, etc) can be produced accurately.

Furthermore, if a large number of servo marks are disposed periodically along concentric or spiral tracks in the first and second areas (ROM and RAM areas), the tracking signal can be obtained by detecting magnetically the magnetic flux distribution generated at the servo marks by the magnetic head, the data can be recorded into the second area (RAM area) or read from the first area (ROM area) while the magnetic head is being servo-controlled.

BRIEF DESCRIPTION OF THE DRAWINGS

FIGS. 4A-4D are schematic sectional views showing magnetic film structures near the preformed pits, respectively;

FIG. 6 shows the relationship between the wobbled tracking servo pits and the magnetic head scanning them;

FIGS. 7A-7C show examples of the detection waveforms obtained when the magnetic head scans along the scanning positions A, B and C shown in FIG. 6, respectively;

FIGS. 14A-14C are explanatory views useful for explaining other methods of forming the rectangular preformed pits, wherein FIG. 14(b) shows an improved example of an optical system used in the mask recording apparatus shown in FIG. 13(a);

FIGS. 15-18 are explanatory views showing other production method of the magnetic recording medium of the present invention, respectively, wherein FIGS. 17A-17D show an example of the production method of the magnetic medium whose preformed pits are non-ferromagnetic and FIGS. 18A-18E show an example of the production method of the magnetic medium from which the base film of the preformed pits is removed;

FIG. 19 shows the magnetic film structure near the preformed pits by the production method shown in FIGS. 17A-17D;

DESCRIPTION OF THE PREFERRED EMBODIMENTS

Figure 1:
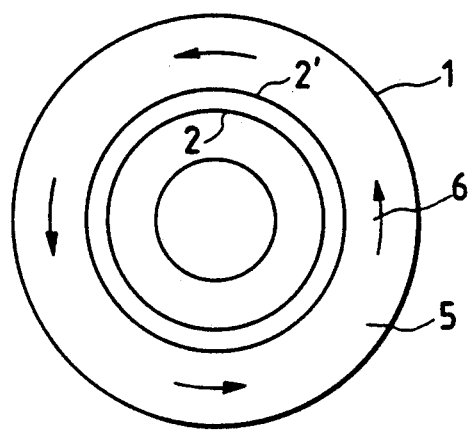
FIG. 1 a schematic view showing an embodiment of a magnetic recording medium (magnetic disk medium) of the present invention.
Figure 2A:
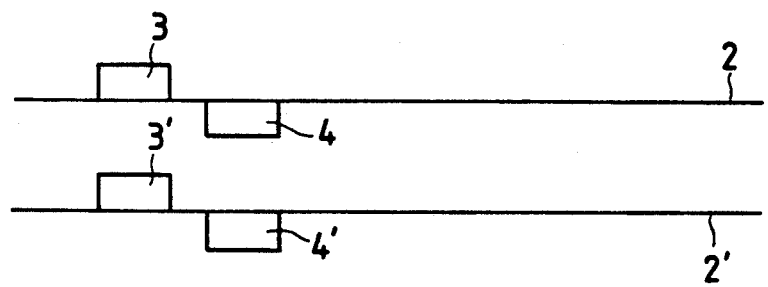
FIG. 2A-2C are views showing examples of recording tracks performed on the recording surface of the magnetic recording medium, respectively.
Figure 2B:
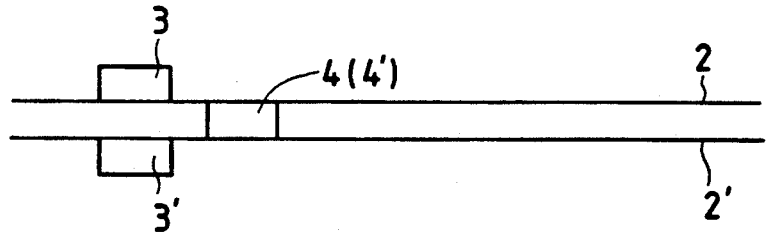
Figure 2C:
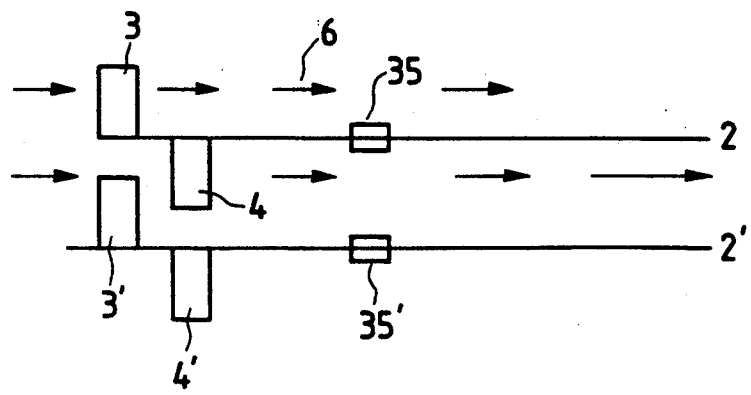

FIG. 1 shows the magnetic recording medium in accordance with an embodiment of the present invention and FIGS. 2A-2C show tracking pits and clock pits that are preformed along recording tracks formed on the recording surface of this magnetic recording medium. In FIG. 1, a magnetic recording medium disk 1 is made of glass, a resin or aluminum, and a large number of tracking servo pits 3, 3', 4, 4' are periodically preformed on the recording surface along concentric or spiral tracks 2, 2' by etching or injection molding as shown in FIGS. 2A-2C. These pits are appropriately preformed by removing the magnetic film by ion milling or reactive ion etching. At least a pair of pits 3, 4 (3', 4') that are preformed and distributed to the right and left with respect to the center line of the tracks 2, 2' are used as servo marks. As shown in FIGS. 2B, the tracking servo pits can be used commonly for the adjacent tracks 2 and 2'. The tracking servo pits may be preformed in a great width in such a manner as to overlap partially with one another in the advancing direction of the tracks, that is, in the circumferential direction, as shown in FIG. 2C. Reference numerals 35 and 35' in FIG. 2C represent clock pits that are disposed along the center line of the tracks 2, 2' and these clock pits, too, are preformed by removing the magnetic film by ion milling or reactive ion etching in the same way as the tracking servo pits.

Figure 3A:
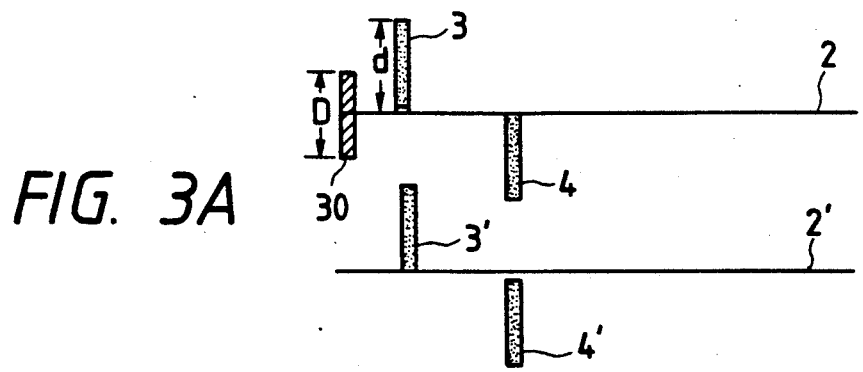
FIG. 3A-3D show other examples to the recording tracks preformed on the recording surface of the magnetic recording medium of FIG. 1 together with recording areas of magnetic heads.
Figure 3B:
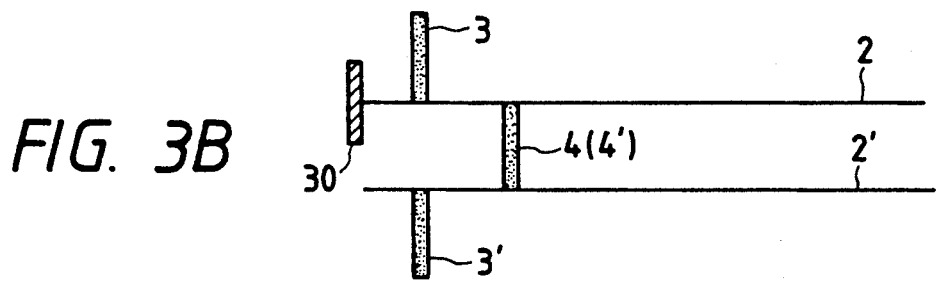
Figure 3C:
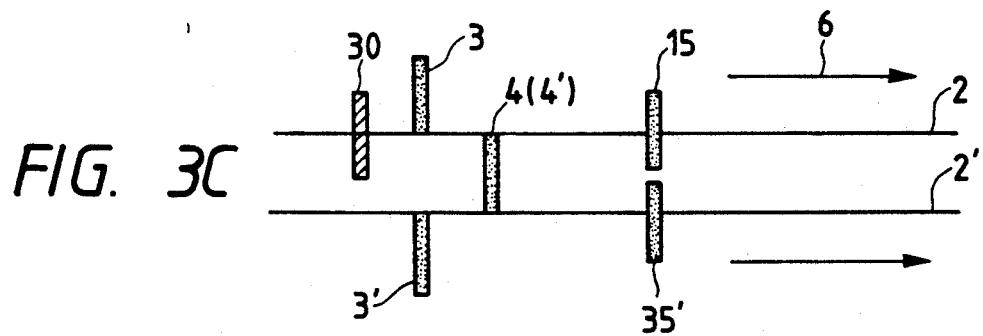

Incidentally, these preformed pits 3, 4, 35, 3', 4', 35' are preferably elongated in a direction at right angles to the data recording direction (in the track direction) as shown in FIGS. 3A-3C and their length d is preferably equal to the width D of the recording area 30 of the magnetic head (the magnetic gap represented by oblique lines).

Figure 3D:
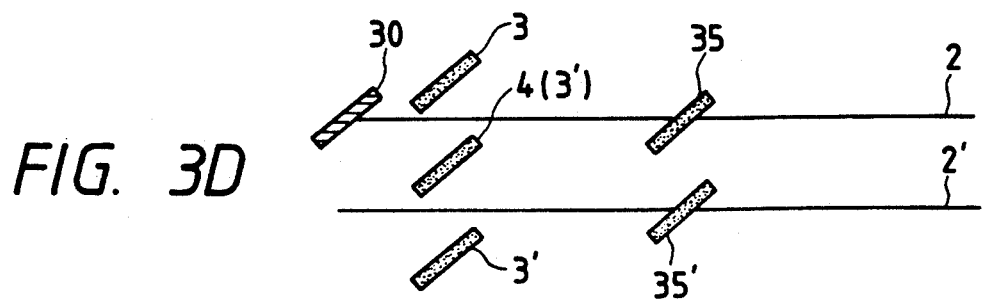

These preformed pits 3, 4, 35, 3', 4', 35' may be inclined with respect to the tracks 2, 2' as shown in FIG. 3D and the data, too, are recorded obliquely by the magnetic gap 30 of the magnetic head which is inclined with respect to the tracks. In this manner, cross-talk between the tracks 2, 2' can be eliminated and the track pitch can be further reduced.

A magnetic recording thin film (a ferromagnetic film) 5 is formed on this medium disk 1 but it does not exist at the portions of the preformed pits 3, 3', 35, 4, 4', 35'. While the magnetic recording medium (magnetic film) 5 is being rotated, its entire surface is uniformly magnetized initially by the magnet. The direction 6 of magnetization is in agreement with the disk circumferential direction, that is, the data recording direction.

FIGS. 4A-4D are sectional views when the preformed pits 20 such as the servo pits 3, 3', 4, 4' or the clock pits 35, 35' are viewed in the disk circumferential direction, that is, in the data recording direction.

Figure 4A:
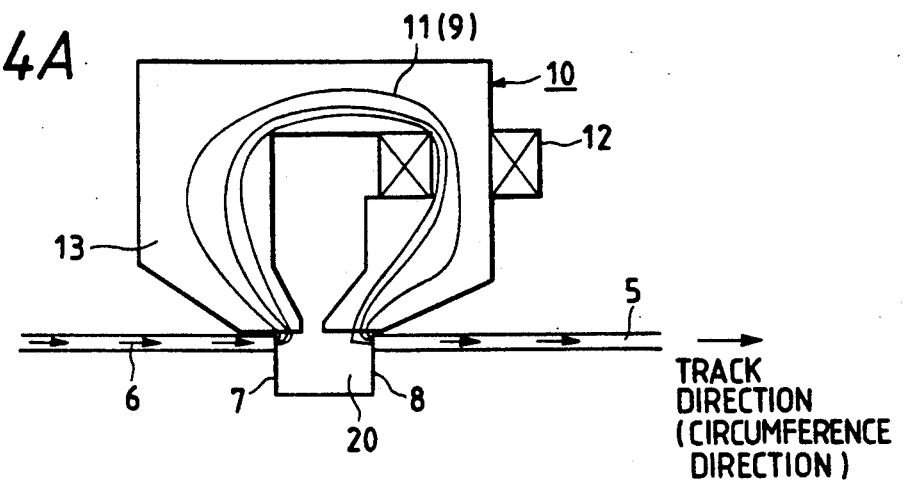
FIG. 4A shows a reading mode in which a magnetic head reads the pits preformed on the recording tracks shown in FIGS. 2 and 3.

FIG. 4A shows the state where the magnetic head 10 reads the preformed pit 20. In the drawing, reference numeral 5 represents the recording magnetic film formed on the substrate 1. This magnetic recording thin film (magnetic film) 5 is magnetized in one direction 6 by initial magnetization, and no leakage magnetic field exists at the place spaced apart from the preformed pits 20. At the preformed pit portions 20 (3, 4', 4, 4', 35, 35'), however, positive and negative magnetic poles 7 and 8 are formed at both of their edges so that a leakage magnetic field occurs from both edges of the preformed pit portion 20. The preformed pits 20 (3, 3', 4, 4', 35, 35') are read magnetically when this leakage magnetic field is detected by the magnetic head 10 positioned on the magnetic recording medium. The magnetic head 10 which is positioned on the rotating magnetic disk recording medium floats with a delicate floating distance of below microns, for example.

Figure 4B:
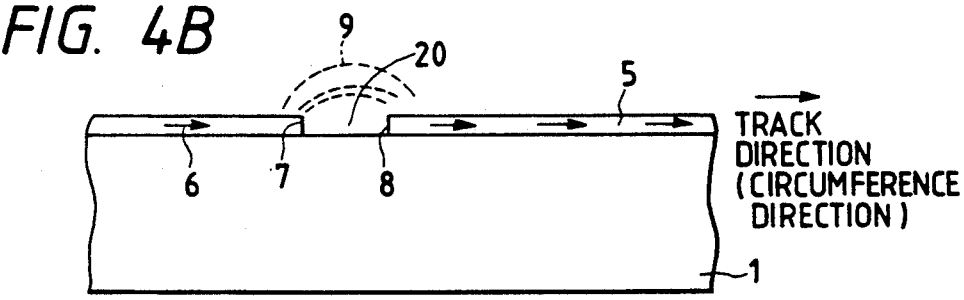
Figure 4C:
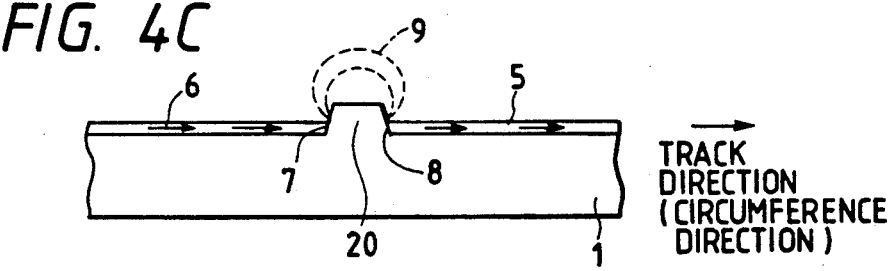
Figure 4D:
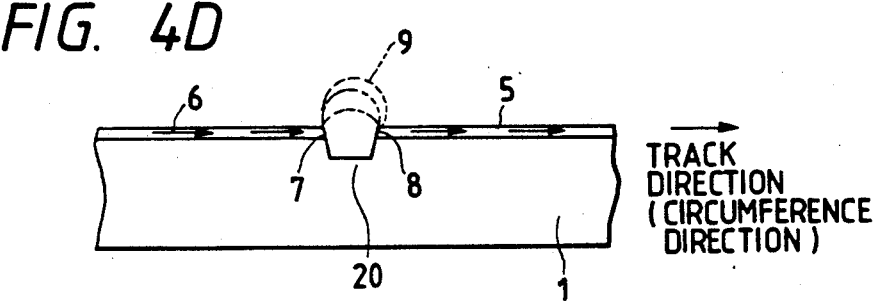

FIGS. 4B-4D show the magnetic film structure structure near the preformed pit 20. FIG. 4B shows an example where the substrate 1 of the pit portion 20 (3, 3', 4, 4', 35, 35') is flat and the magnetic film 5 does not exist at this portion. In this arrangement, the N and S magnetic poles 7 and 8 are formed at both edges of the preformed pit 20 and therefore, the leakage magnetic field 9 occurs at both edges of the preformed pit 20. FIG. 4C shows the case where substrate 1 at the portion of the preformed pit 20 is convexed and no magnetic film 5 exists at this convex pit portion. FIG. 4D shows the case where the preformed pit 20 is concaved and no magnetic film 5 exists at this concave pit portion, either. The depth of these preformed pits 20 (3, 3', 4, 4', 35, 35') is preferably substantially equal to the pit width in the data recording direction and if the magnetic film 5 is 0.1 $\mu$ thick, for example, the depth of the preformed pit 20 is from 0.1 to 0.5 $\mu$. The pit length of the preformed pit 20 in the data recording direction may be 0.5 $\mu$ and the pit width in the disk radial direction, from 1 to 20 microns. In any of the cases shown in FIGS. 4B-4D, the N and S magnetic poles 7, 8 are formed at both edges of the preformed pit 20 (the servo pits 3, 3', 4, 4' or the clock pits 35, 35') so that the leakage magnetic field 9 occurs at both edges of the preformed pit 11. These pits can be detected magnetically by detecting the magnetic flux 9 occurring from the edges of the preformed pit 11 by the magnetic head 10. In other words, magnetic reading can be made by scanning such preformed pits 20 by the magnetic head 10 and detecting the magnetic flux 11 formed at the core 13 of the magnetic head 10 when the magnetic head 10 passes the preformed pits 20, by the magnetic coil 12.

Figure 5:
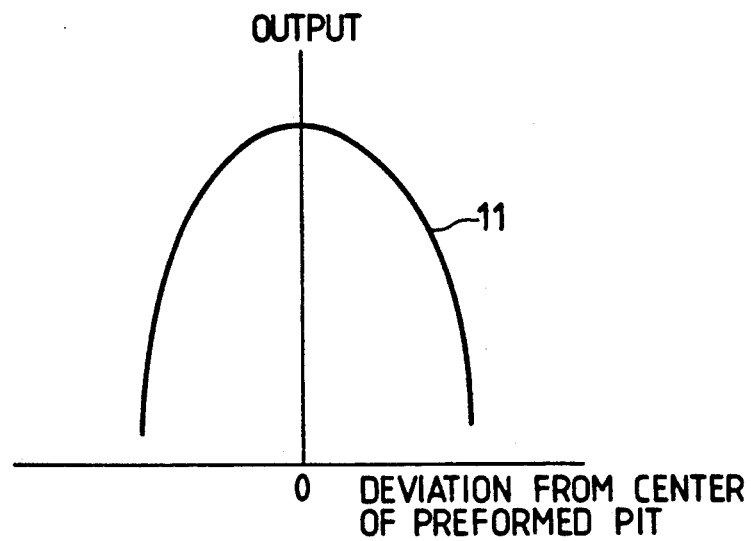
FIG. 5 shows the output of the magnetic head obtained when the magnetic head travels on the preformed pits in a direction at right angles to the data recording direction.

FIG. 5 shows the intensity of the magnetic flux passing through the magnetic coil 12 when the magnetic head 10 scans the preformed pit 20 in a direction at right angles to the data recording direction, that is, in the radial direction. This magnetic flux 11 provides a desirable output signal if the dimension D of the magnetic head 10 in the direction at right angles to the data recording direction is made to be substantially equal to the width d of the preformed pit 20 in the direction at right angles to the data recording direction. In FIG. 5, the magnetic flux 11 is symmetric with respect to the pit center and though the degree of track deviation can be known from this, the direction of the track deviation cannot be detected.

Therefore, the present invention uses the preformed pits 3, 4 (3', 4') that are wobbled with respect to the track center on the magnetic recording medium as the tracking servo pits for detecting the degree and direction of the track deviation.

Figure 6:
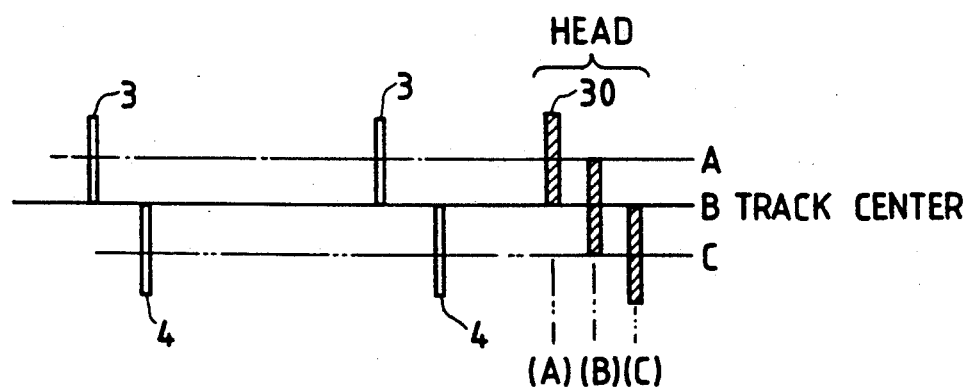
FIGS. 6 and 7A-7C are explanatory views each being useful for explaining the detection operation of the tracking signal in accordance with the present invention.
Figure 7A:
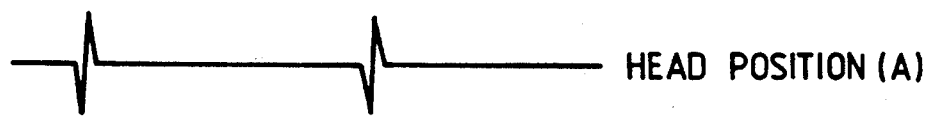
Figure 7B:
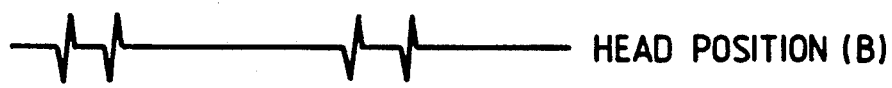
Figure 7C:
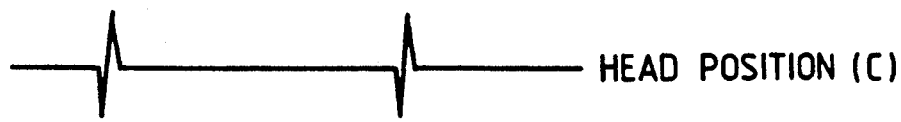

The operation of detecting the tracking signal from the wobbled preformed pits 3, 4 (3', 4') shown in FIGS. 2A-2C and 3A-3D will be explained with reference to FIGS. 6 and 7A-7C. In FIG. 6, let's consider the case where the center of the magnetic head 10 passes along A, B and C, respectively. When the magnetic head passes along the one-dot-chain line A, the magnetic head passes on the pit 3 so that the signal detected by the magnetic head is great in the case of the signal from the pit 3 but is small in the case of the signal from the pit 4. Accordingly, the detection signal shown in FIG. 7A can be obtained. FIG. 7B shows the detection waveform in the case where the magnetic head passes along the solid line B (track center) and FIG. 7C shows the detection waveform in the case where the magnetic head passes along the two-dot-chain line C in FIG. 6. Therefore, the tracking signal representing the degree and direction of the track deviation can be obtained by sampling and detecting the read signals of the magnetic head 10 which are obtained when the magnetic head 10 passes on the preformed pits 3, 4 (3', 4') and determining the difference between them. In order to make control so that the position of the magnetic gap 30 of the magnetic head 10 is in conformity with the track center, tracking control must be made by moving the position of the magnetic head 10 in the direction at right angles to the data recording direction (or in the radial direction) by use of the detected tracking signals so as to always obtain the detection waveform shown in FIG. 7B.

Next, a method of magnetically recording and reading data while making high precision tracking control of the magnetic head by use of those tracking servo pits which can be detected magnetically and which are in advance formed on the magnetic disk will be explained.

Figure 8:
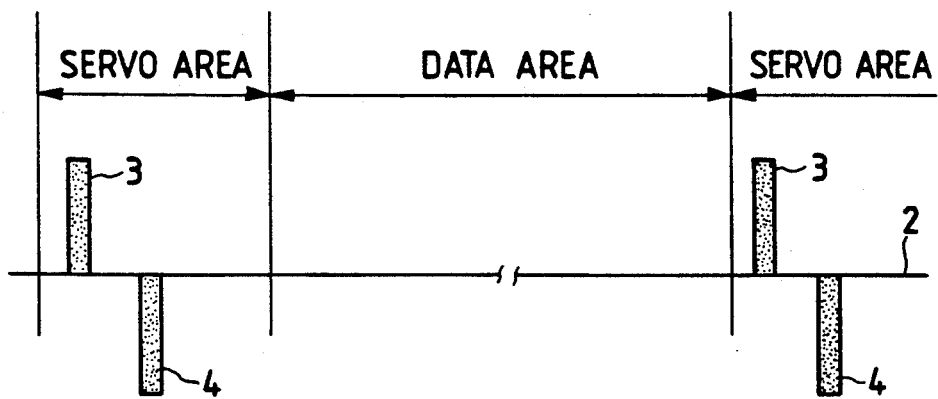
FIG. 8 is an explanatory view of one embodiment of the recording/reading method of the present invention for recording and reading data in a data area while tracking control is being made by the tracking signal detected in the servo area.

FIG. 8 shows the case where both recording/reading of the data and detection of the tracking signal can be made by use of one magnetic head 10. The concentric or spiral track 2 is divided into the servo area for detecting the tracking signal and the sync signal and the data area for recording the data. A large number of these servo areas and data areas are disposed alternately and periodically along the track. The preformed pits in these servo areas and the recorded data in the data areas are detected by one magnetic head 10 on a time division basis. A pair of preformed pits 3, 4 described above which are wobbled with respect to the track center on the magnetic recording medium are formed as the tracking servo marks for detecting the degree and direction of the track deviation, in each servo area. Incidentally, the clock pits represented by reference numerals 35 and 35' in FIGS. 2C may 3C may be disposed along the track center line in each servo area. They may also be inclined with respect to the track as shown in FIG. 3D. Furthermore, track address pits may be preformed along the track center line, whenever necessary. As described already, these preformed pits in each servo area have locally different magnetic characteristics from those of the recording magnetic film 5 and are formed by removing the magnetic film 5 by ion milling or reactive ion etching. They are read magnetically by detecting the leakage magnetic field generated from both edges of these preformed pits by the magnetic head 10. The tracking signal can be obtained by sampling and detecting the leakage magnetic field occurring from the edges of the pair of wobbled preformed pits 3, 4 by the magnetic head 10 as has already been explained in detail with reference to FIGS. 6 and 7A-7C. While the magnetic head 10 is being subjected to the servo position control by the tracking signal thus obtained, desired data are recorded or read by the magnetic head 10 in the data areas between the servo areas along the center line of the track. The magnetic head 10 is supported by a support mechanism (not shown in the drawing) connected to an actuator (not shown in the drawing) and can be moved in the direction at right angles to the data recording direction (e.g. in the radial direction of the magnetic disk) by driving this actuator. Accordingly, when the actuator is driven on the basis of the detected tracking signal, the magnetic head 10 is subjected to the tracking control so that it always scans the center of the track and the data can be accurately recorded or read along the track center of the data areas by the magnetic head 10 which is subjected to the tracking control. Incidentally, if the data area is elongated, it is advisable to hold the detected tracking signal from the wobbled pits of the servo areas during the data area period. In this embodiment the magnetic film 5 is a magnetic thin film for horizontal recording and the data recorded in the data area are recorded horizontally (or magnetized in a direction parallel to the magnetic film 5) by the magnetic head 10.

Figure 9:
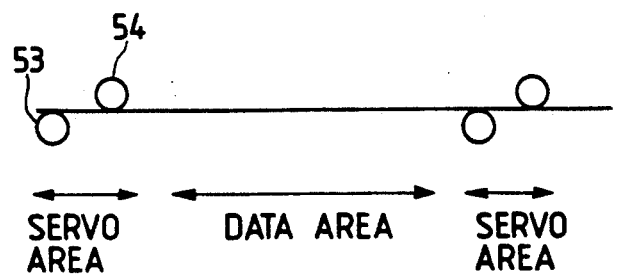
FIGS. 9, 10 and 11 show other examples of the tracking servo pits preformed in the servo areas, respectively.
Figure 10:
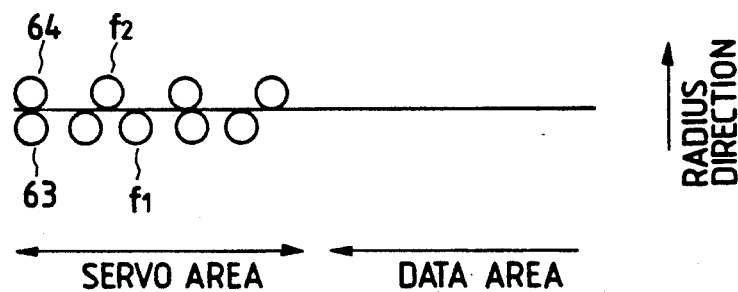

FIGS. 9 and 10 show other examples of track patterns of the magnetic recording medium used in the present invention. In either case, the servo areas for detecting the tracking area and the data areas for recording the data are separated in the track and one magnetic coil detects the signals on the time division basis in the same way as in FIG. 8. The desired data are recorded and read by the magnetic head which is subjected to tracking control, into and from the data area between the servo areas along the track center. In FIG. 9, a pair of circular pits 53, 54 are preformed in the wobbling arrangement with respect to the track center, as the tracking servo marks in each servo area. In FIG. 10, a pit line 63 having a frequency $f_1$ are preformed at a position deviated slightly in a —(minus) direction from the track center (on the inner circumferential side in the direction at right angles to the data recording direction, for example) in each servo area and another pit line 64 having a frequency $f_2$ are preformed at a position deviated in a+(plus) direction).

Figure 11:
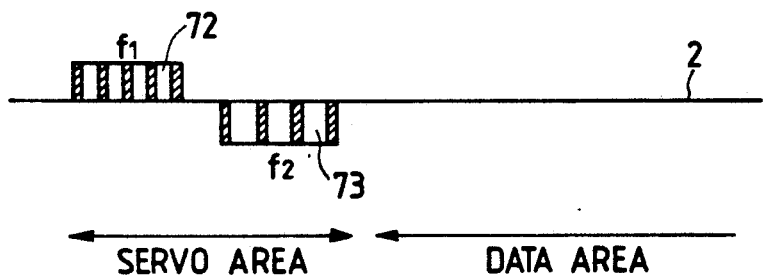
Figure 12:
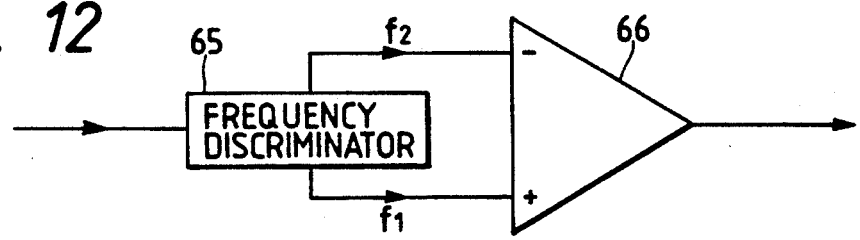
FIG. 12 is an explanatory view useful for explaining a method of detecting the tracking signal from the tracking servo pits shown in FIGS. 10 and 11.

In FIG. 10, the preformed pit lines 63, 63 are composed of the circular pits. In order to improve the recording density in the track direction and S/N, however, it is more suitable to preform the pit lines 63, 64 with the rectangular pits which are elongated in the direction at right angles to the data recording direction and have lengths substantially equal to the width of the recording area 30 of the magnetic head 10. FIG. 11 shows the pit lines 72, 73 having different frequencies $f_1$, $f_2$ that are preformed with the rectangular pits as corrugations, for example. Since the pit lines having the frequencies $f_1$, $f_2$ can be separately detected by frequency discrimination, they can be simultaneously preformed on both sides of the track center as shown in FIG. 10 and can be detected simultaneously or can be preformed in the deviated arrangement along the track as shown in FIG. 11 and can be detected on the time division basis. The method of detecting the tracking signals from the preformed pit lines having these frequencies $f_1$, $f_2$ will be explained with reference to FIG. 12. The detection signal of the magnetic head 10 scanning along the track is separated into the component of the frequency $f_1$ and to the component of the frequency $f_2$ by a frequency discriminator 65. Each frequency component is amplified by a differential amplifier 66 and the tracking signal can be obtained. The tracking signal is sent to the actuator for changing the position of the magnetic head in the radial direction. When the amplitude of each component is equal to that of the other, it can be known that the magnetic head is at the track center.

Next, the production method of the magnetic recording medium having the preformed pits described above will be explained.

Figure 13A:
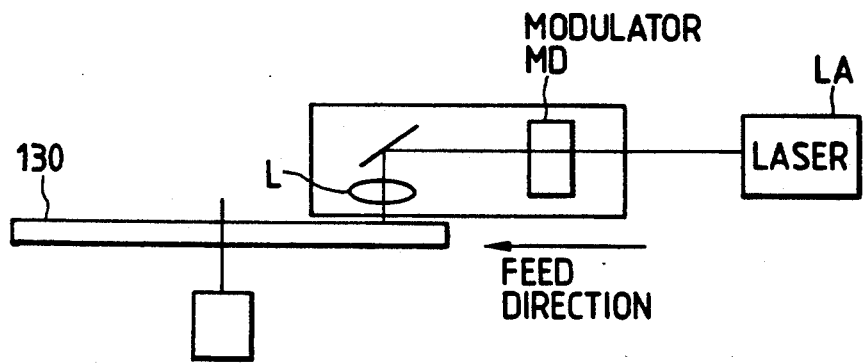
FIG. 13A shows an example of a mask recording apparatus used for the recording medium production method of the present invention.
Figure 13B:
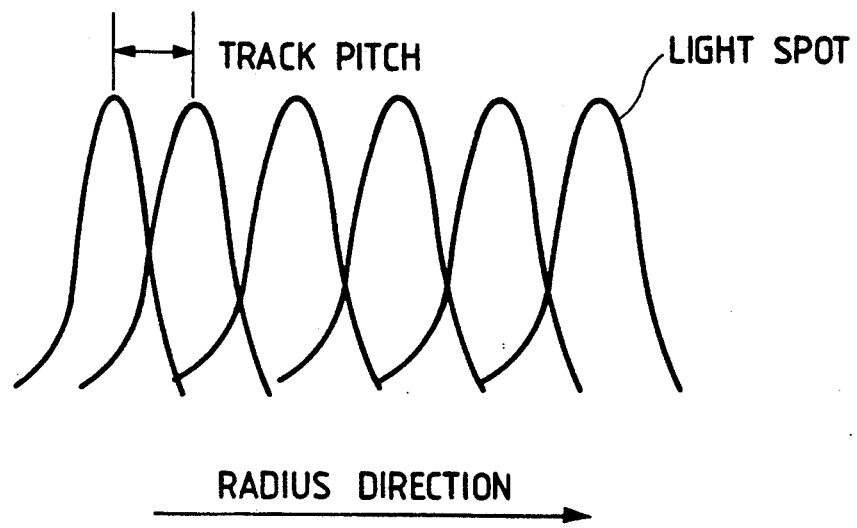
FIG. 13B is an explanatory view useful for explaining a method of forming uniform and rectangular preformed pits.

FIG. 13A shows a recording apparatus of a photomask used in the production method of the present invention. This recording apparatus is for recording patterns of data to be stored in advance on the magnetic recording medium 1 or patterns of the signals to be preformed, such as the ROM data which are in advance stored in the ROM area and can be read magnetically and patterns of the signals to be preformed such as servo marks, clock pits, address pits, and the like, which are provided in a large number periodically along the track in the ROM area and/or the RAM area and can be read magnetically in the servo areas, onto a chromium photomask 130 by ultraviolet laser beam. In FIG. 13A, the chromium photomask 130 is fixed to a spindle receptacle and is rotated. On the other hand, the laser beam such as argon laser (w=0.45 micron) LA is intensity-modulated by an optical modulator MD in accordance with the signal to be preformed and when it is condensed by a lens system L having high NA (e.g. NA=0.93), it forms a circular spot having a diameter of about 0.4 microns on the rotary mask 130. It will be hereby assumed that each preformed pit 20 constituting the ROM data, the tracking servo mark, the clock pit and the address pit is elongated in the disk radial direction and its size is 5 microns, for example. Then, a longitudinally elongated pit can not be formed by the circular spot of 0.4 microns. FIG. 13B is an explanatory view useful for explaining an example of the method of forming a longitudinally elongated pit. In FIG. 13A, the optical system moves linearly in the disk radial direction while being placed on a moving table and it is advisable to control its moving speed so that the optical system moves by a distance smaller than the optical spot diameter such as a distance equivalent substantially to the radius of the optical spot while the photomask 130 rotates once. Then, the integration value of the quantity of the beam irradiated to the desired portion of the photomask 130 becomes a uniform rectangle as shown in FIG. 13B. In order to form a longitudinally elongated preformed pit of 5 microns by the optical spot diameter of 0.4 microns, for example, the moving distance of the optical system is 0.2 micron/revolution and intensity modulation of the beam may be effected at desired timing while the photomask 130 rotates 25 turns, i.e. 5/0.2=25, in accordance with the signal to be preformed.

Figure 14A:
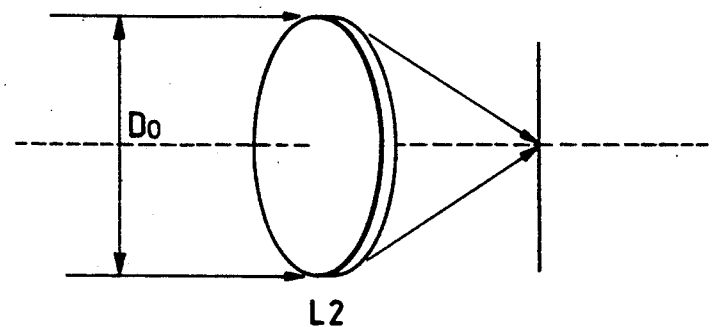
Figure 14B:
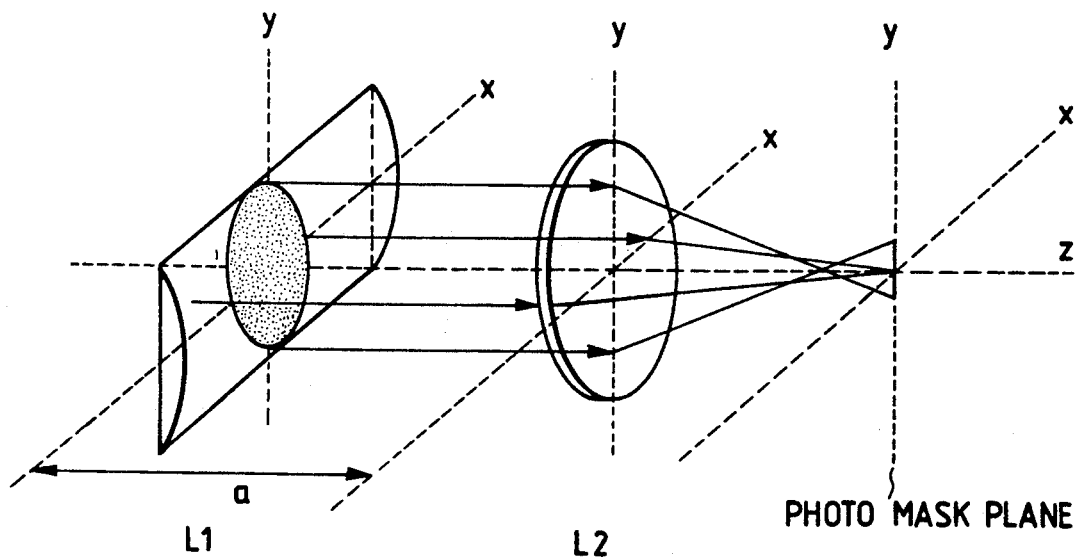
Figure 14C:
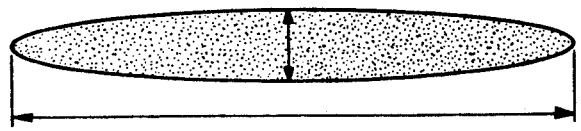

FIGS. 14A-14C show another method of forming the rectangular preformed pit. This embodiment improves the optical system in the recording apparatus of the photomask 130. To obtain each preformed pit 20 which has a width of 0.5 microns (the length in the track direction) and a length of 10 microns (the length in the direction at right angles to the track), for example, a rectangular laser spot having a width of 0.5 microns and a length of 10 microns must be formed on the photomask 130 by the laser beam of the optical system. In FIG. 14A, an objective lens L2 is a symmetry-of-rotation type diffraction limit lens having a high numerical aperture (NA) such as NA=0.936. If the wavelength of the laser LA is w=0.45 microns, the laser beam diameter is $D_o$=5 mm and a focal length of f=2.67 mm, the spot of this laser beam formed by the objective lens L2 is a round spot having, a diameter $d_o$=2 WF/$D_o$=0.48 microns. In FIG. 14B, an elongated spot can be obtained by disposing a cylindrical lens L1 on the laser incident side of the objective lens L2. If the focal length of the cylindrical lens L1 is $f_x$ and $f_y$ in the x and y directions, respectively, $f_x$ is infinite whereas $f_y$ is definite and is 1 m, for example.

Assuming $f_1=f_y$, the deviation of focus in the y direction between the optical systems shown in FIGS. 14A and 14B is expressed as follows:

$$z=(f_2)^2/(f_2+f_1-a) \tag{1}$$

The deviation X of focus in the x direction between the optical systems shown in FIGS. 14A an 14B does not change and is X=0. Here, symbol a represents the gap between the lenses $L_1$ and $L_2$. Therefore, the following equation is established from the optical system shown in FIG. 14B:

$$y/z=D/f_2 \tag{2}$$

From the two formulas given above, $$f_1-a=D_o \cdot f_2/y \tag{3}$$

Symbol a represents the gap between the lenses $L_1$ and $L_2$.

When the laser beam diameter $D_o$=5 mm, the focal length $f_2$=2.67 mm and y=10 microns are substituted into the formula (3), $f_1-a$=1,225 mm can be obtained. Since ($f_1-a$) is 1.3 m and the focal length $f_y$ of the lens $L_1$ is extremely great, the influences of aberration generated by the cylindrical lens $L_1$ are small, the spot size in the x direction is as small as 0.48 microns and only the spot size in the y direction is 10 microns. In this manner, it becomes possible to form a rectangular laser spot such as shown in FIG. 14C, which is 0.5 micron-wide and 5 to 10 micron-long by disposing the cylindrical lens $L_1$ having a focal length $f_y$ of 50 cm to 10 m in front of the objective lens $L_2$.

The mask 130, on which the patterns consisting of the preformed pits 20 (tracking servo pits 3, 4, 3', 4', . . . ; 53, 54; 63, 64; 72, 73; address pits and clock pits 35, 35', . . . , later-appearing ROM data pits 17, . . . ) are recorded, are developed by the recording apparatus of the photomask described above and after etching is effected, the mask 130 having the patterns of the desired preformed pits 20 recorded thereon can be obtained. The magnetic recording medium is produced by use of this mask 130 in accordance with the processes of an embodiment of the present invention shown in FIGS. 15A to 18E.

FIGS. 15A-15D show an example of the production method of the magnetic recording medium obtained by removing the magnetic thin film (magnetic film) 5 of each preformed pit 20.

Figure 15A:
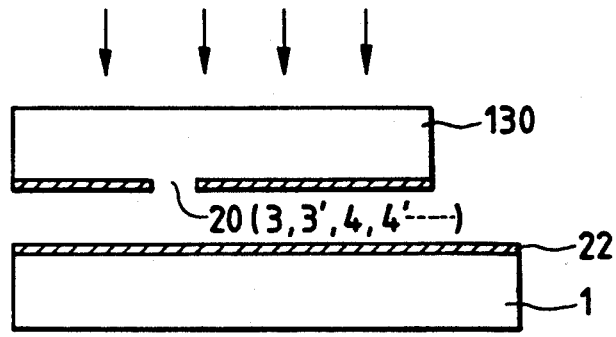
FIGS. 15A-15D show an example of the production method of the magnetic medium from which the magnetic film of the preformed pits is removed.
Figure 15B:
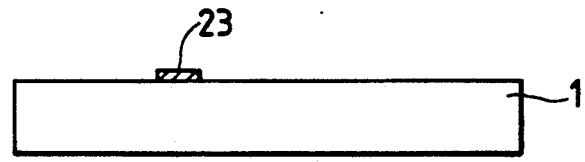
Figure 15C:
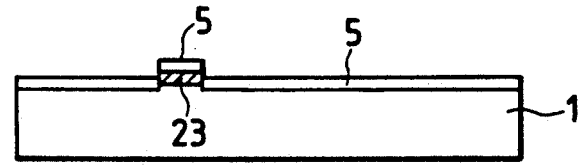
Figure 15D:
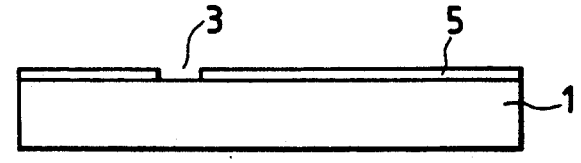

In FIG. 15A, a negative resist 22 is applied to an aluminum or glass disk substrate 1 and exposure is effected by bringing the mask 130 described above into close contact with this photoresist-coated disk substrate 1. In FIG. 15B, after the negative resist 22 is exposed, the mask 130 is removed and development is then made. In this case, the photoresist 23 at portions other than the pit portions 20 is dissolved by development and remains only at the pit portions. In FIG. 15C, the magnetic thin film 5 is formed by sputtering on the entire surface of the disk substrate 1 on which the resist 23 described above remains. In FIG. 15D, the resist 23 on the disk is removed therefrom. When the resist 23 is removed by plasma asher or an organic solvent, for example, the magnetic thin film 5 at the pit portions 20 is removed and the magnetic recording medium not having the magnetic film 5 only at the pit portions 20 can thus be formed. In FIG. 15D, the magnetic film 5 which is applied in a projecting form may be removed. For example, when the disk surface is thinly polished, the magnetic film at the pit portions where the magnetic film is applied in the projecting force can be eliminated.

Figure 16A:
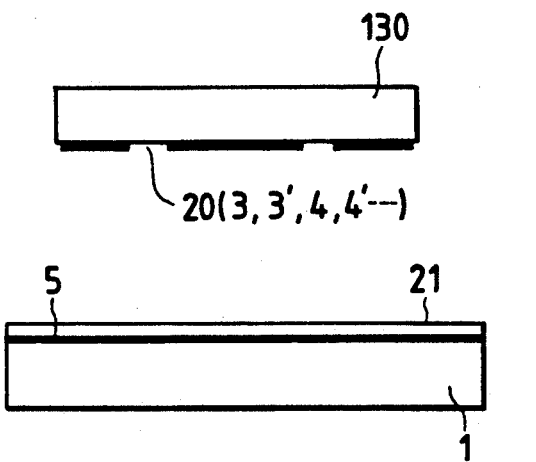
FIGS. 16A-16D show another example of the production method.
Figure 16B:
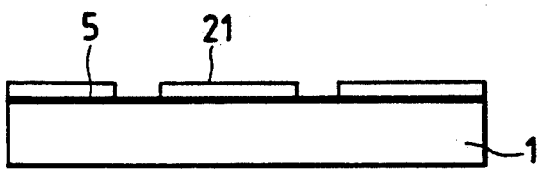
Figure 16C:
Figure 16D:
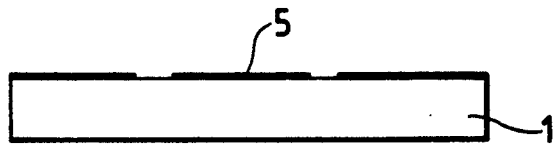

FIGS. 16A-16D show another example of the production method of the magnetic recording medium 20 from which the magnetic film (magnetic recording film) 5 at each pit portion 20 is removed. In FIG. 16A, after the magnetic thin film 5 is uniformly formed by sputtering on the aluminum or glass substrate 1, the positive photoresist 21 is applied and then exposure is effected by bringing the mask 130 described above into close contact with the disk substrate 1 on which the magnetic film 5 and the photoresist 21 are thus formed. In FIG. 16B, after the exposure of the positive resist 21, the mask 130 is removed and then development is effected. The resist at the pit portions 20 is dissolved by the development but the resist at other portions remains. In FIG. 16C, the magnetic thin film 5 at the pit portions 20, where the resist does not exist, is etched and removed by ion milling, for example. In FIG. 16D, the resist 21 of the unexposed portions on the disk is removed by an organic solvent, for example. This production method, too, can produce the magnetic recording medium not having the magnetic film only at the preformed pit portions 20.

FIGS. 17A-17D show an example of the production method of the magnetic medium whose preformed pits 20 are a non-ferromagnetic material.

The processes shown in FIGS. 17A, 17B and 17D are, the same as those shown in FIGS. 16A, 16B and 16D respectively. In FIG. 17C, hydrogen, argon, nitrogen, boron, neon or dysprosium 23 is implanted to convert the magnetic film 5 at the preformed pit portions from the ferromagnetic material to the non-ferromagnetic material so as to obtain the magnetic recording material only the preformed pit portions 20 of which are not ferromagnetic. When only the preformed pit portions are changed to the non-ferromagnetic material, the magnetic poles are formed on both edges of each preformed pit 20 because the magnetic film is ferromagnetic at portions other than at the pit portions. As a result, since the leakage magnetic field is generated from the edges of each preformed pit, the pits can be detected magnetically by the magnetic head 10 in the same way as described already. Incidentally, FIG. 19 shows in enlargement the portion of the preformed pits 20 in accordance with this production method.

Figure 18A:
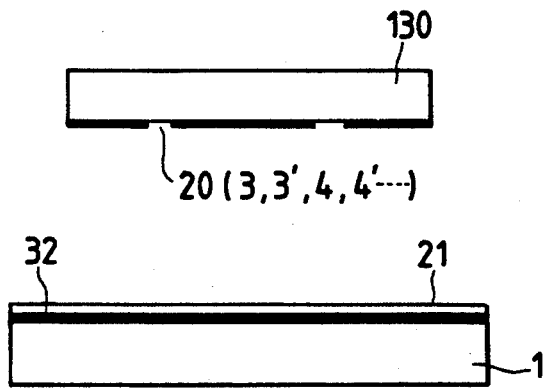
Figure 18B:
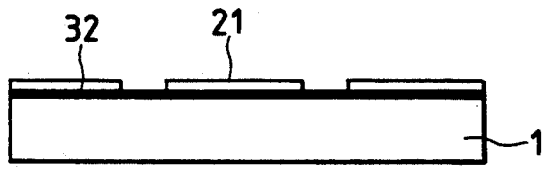
Figure 18C:
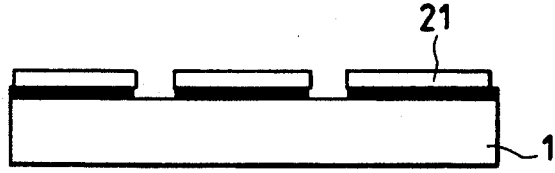
Figure 18D:
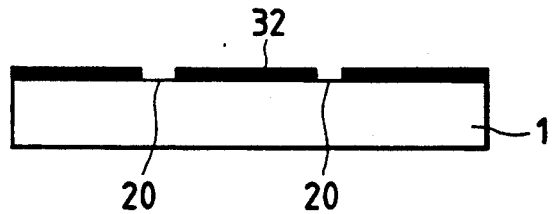
Figure 18E:
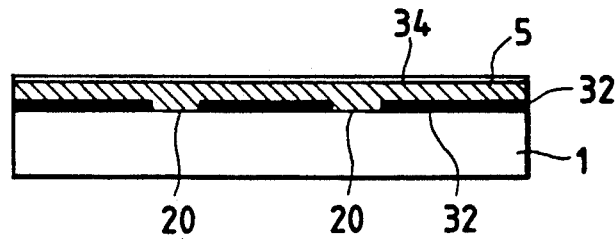

FIGS. 18A-18E show an example of the production method of the magnetic recording medium not having the base film for each preformed pit 20. In FIG. 18A, a Cr thin film 32 is formed by sputtering on the aluminum or glass disk substrate 1 and the positive resist 21 is then applied. Exposure is effected by bringing the afore-mentioned mask 130 into close contact with the disk substrate 1 on which this Cr base film 32 and the photoresist 21 are formed. In FIG. 18B, after the exposure of the positive resist 21, the mask 130 is removed and development is then effected. The resist 21 at the pit portions 20 is dissolved by the development but the resist 21 at other portions remains. In FIG. 18C, the Cr thin film 32 at the pit portions 20 not having the resist 21 is removed by reactive ion etching, for example. In FIG. 18D the resist 21 at the unexposed portions on the disk is removed by an organic solvent, for example. In FIG. 18E, the ferro-magnetic film 5 such as CoNiZr and a protective film 34 such as C are uniformly formed by sputtering on the pattern of the Cr thin film 32. This production method can produce the magnetic recording medium not having the Cr base film 32 only at the preformed pit portions 20.

Figure 20A:
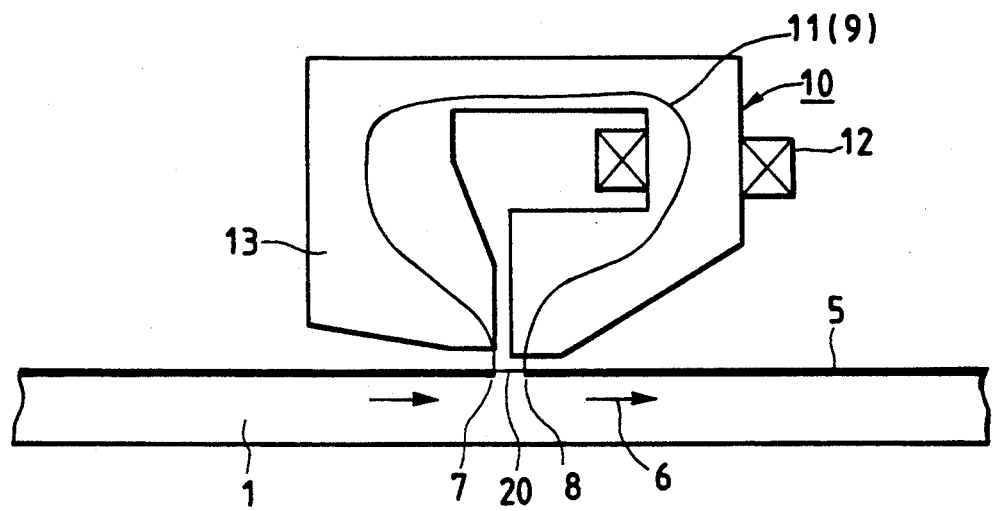
FIGS. 20A-20B show the reading method of the preformed pits by the production method of FIGS. 18A-18E and its magnetic film structure.
Figure 20B:
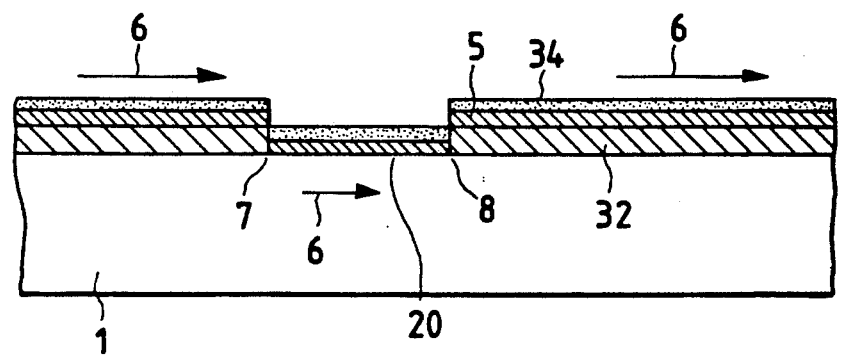

FIG. 20B shows in enlargement the portion of the preformed pit 20 in accordance with this production method. FIG. 20A shows the case where the magnetic head 10 scans the preformed pit 20 and FIG. 20B shows the magnetic film structure near the preform pit 20. The structure of the magnetic film at portions other than the preformed pit portions 20 is formed by sputtering a 300 to 500 nm-thick Cr film 32 as the base film on the aluminum (Al) or glass substrate 1, then sputtering a 50 to 70 nm-thick ferromagnetic film 5 such as CoNiZr on the former and further sputtering the protective film 34 such as C.

The Cr base film 32 is partially removed at each preformed pit portion 20 and only the ferromagnetic film (magnetic recording film) 5 and the protective film 34 are formed. After the film formation, the magnetic recording medium is initially magnetized uniformly by a magnet on its entire surface while it is being rotated. The direction 6 of magnetization is in conformity with the disk circumferential direction, that is, the data recording direction.

The Cr base film 32 has the effect of improving saturated magnetization Ms of the ferromagnetic film 5. Since the Cr base film 32 does not exist at each preformed pit portion 20, saturated magnetization becomes small there. If the recording magnetic film 5 is magnetized unidirectionally in direction 6 by initial magnetization, the leakage of the magnetic field does not occur at positions spaced apart from the preformed pits 20. However, since saturated magnetization is small at each preformed pit portion 20 such as the servo pits 3, 4, 3', 4', etc, the positive and negative magnetic poles are formed at both edges 7, 8 of each preformed pit 20 and as a result, the leakage of the magnetic field 9 occurs from the edges of each preformed pit. Accordingly, the pits can be read magnetically by the magnetic head 10 in the same way as described already.

As described above in detail with reference to FIGS. 15A to 20B, the production method of the present invention can easily form the magnetic recording medium equipped with the preformed pits whose magnetic characteristics are locally different from those of the magnetic film and which can be detected magnetically. Moreover, since the mask 130 having the preformed pit patterns to be provided in advance on the magnetic recording medium can be used a large number of times, large quantities of magnetic recording media having the same pattern can be produced precisely. The production method shown in FIGS. 15A to 18E can also form arbitrary patterns other than the preformed pits, and can preform, for example, linear ditches free from the magnetic thin film on the magnetic recording medium by forming in advance such liner ditches. Needless to say, pits for synchronization, address pits or pits for access can be likewise preformed as the servo pits besides the tracking pits. Incidentally, though the protective film 34 has not been explained in the production methods shown in FIGS. 15A to 17D, the protective film 34 of C or the like is preferably formed on the recording magnetic film 5 in the production methods shown in FIGS. 15A to 17D in the same way as in the production method shown in FIG. 18E.

Figure 21:
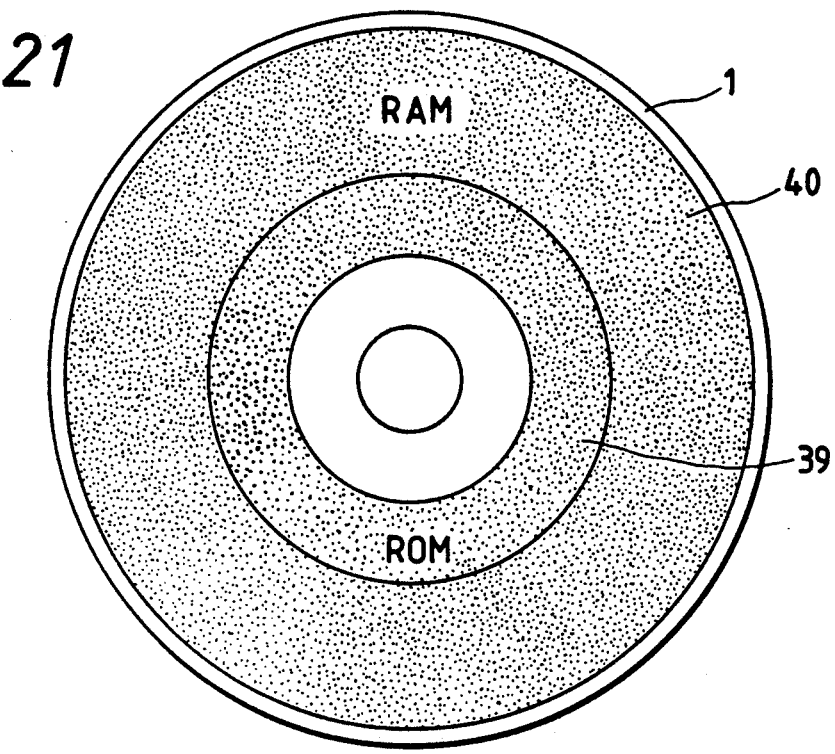
FIGS. 21 and 22 show embodiments of the magnetic recording medium of the present invention, respectively, and show the magnetic disk medium wherein an ROM area and an RAM area co-exist in mixture.

In the fore-going description, the data area between the servo areas assumes the case of the magnetic recording medium which can be freely recorded and erased by the magnetic head 10. Here, the disk having such a function is referred to as the "disk having the RAM function". As a further extended use method of the disk, the form of a disk wherein the areas 40 having the RAM function and the ROM or read-only areas 39 exist in mixture as shown in FIG. 21 can be conceived. Such a structure provides the advantage that the read-only data and the rewritable data can be accessed simultaneously within a short period of time.

Figure 22:
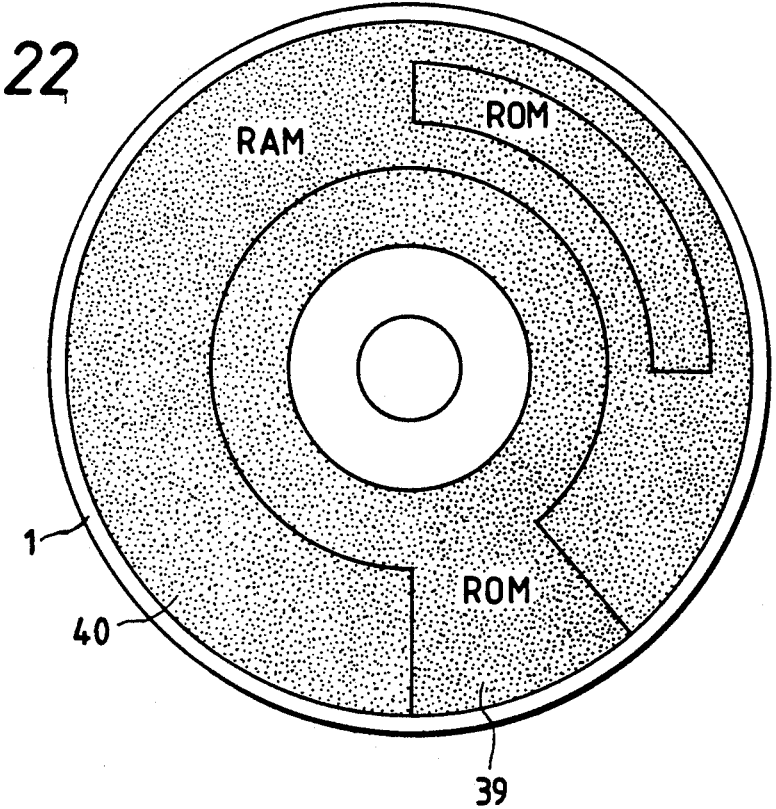

In other words, the magnetic disk 1 has the magnetic film to and from which the data can be recorded and read magnetically, the second area (RAM area) 40 to and from which the user can record and read the data magnetically and the first area (ROM area) in which magnetically readable data are preformed. In FIG. 21, the RAM area 40 is shown disposed on the outer peripheral side and the ROM are 39, on the inner peripheral side. In FIG. 22, the RAM area 40 is shown disposed on the outer peripheral side and the ROM area 39, on the inner peripheral side at the same time, the ROM are 39 is divided by suitable angles and exists in mixture inside the RAM area 40. The concentric or spiral tracks are disposed in the RAM area 40 and in the ROM area 39, and the data are recorded and read and/or read along the tracks.

Figure 23:
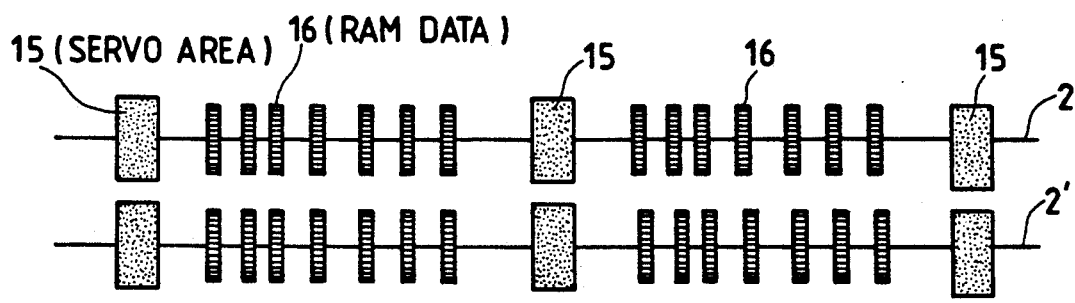
FIGS. 23 and 24 show an example of recording tracks in the RAM area, respectively.
Figure 24:
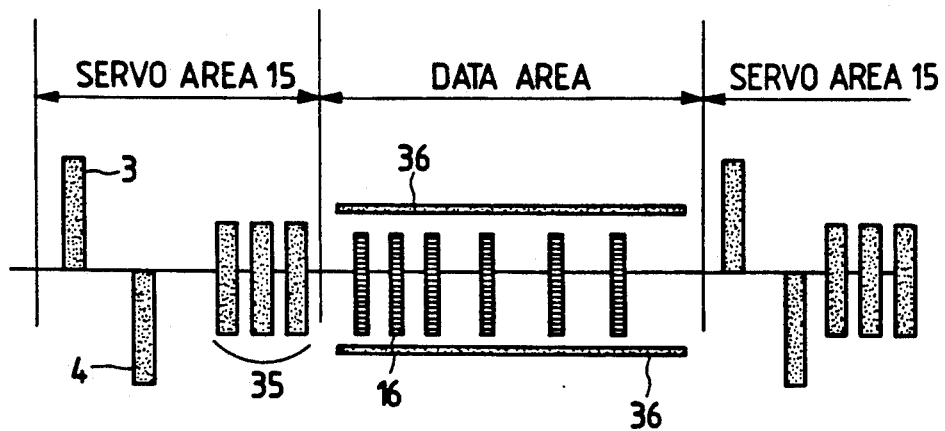

FIG. 23 shows the data recording tracks in the RAM area 40 described above. In FIG. 23, the data tracks 2, 2' consist of the combination of a large number of servo areas 15 disposed periodically along the track and the RAM data 16 recorded in the user data recording areas (data areas) between these servo areas 15. The preformed pits each having the different magnetic characteristics from those of the recording magnetic film and formed by etching and removing locally the magnetic film, as described above, are formed in each servo area 15 and the tracking signal is obtained by sampling and detecting magnetically the magnetic field occurring at the edges of the preformed pit inside the servo area 15 by the magnetic head 10. While the magnetic head 10 is being subjected to the servo position control on the basis of the tracking signal thus obtained, the desired RAM data (e.g. code data) 16 are recorded or read along the center line of the tracks 2, 2' in the user data recording areas (data areas) between these servo areas 15. The magnetic film is a magnetic thin film for horizontal recording and the RAM data 16 are horizontally recorded or read by the magnetic head 10 which is subjected to the tracking control. Incidentally, the tracking marks consisting of a pair of tracking servo pits distributed to the right and left with resected to the center line of the tracks 2, 2' as explained with reference to FIGS. 2A–2C, 3A–3D, 9 or the pit lines 63, 64 72, 73 distributed to the right and left with respect to the center line and having the different frequencies and/or phases as explained with reference to FIGS. 10 and 11 are used as the preformed pits inside the servo area 15. The address pits and the close pits 35, 35' are preformed, whenever necessary. FIG. 24 shows one example.

FIG. 24 shows one example of the recording track inside the RAM area 40. A pair of wobbled servo pits 3, 4 which are wobbled with respect to the track center are preformed as the tracking servo marks in each servo area 15. In the drawing, the pits represented by reference numeral 35 are preformed pits relating to the clock and access marks, which has the same magnetic film structure as the servo pits 3, 4 and are preformed on the substrate 1. Reference numeral 36 represents the groove formed between the tracks and these grooves are directed to reduce cross-talk between the tracks at the time of the data read-out operation. This groove 36, too, has the same structure as the servo pits 3, 4 and are preformed. Reference numeral 16 represents the data which are magnetically recorded by the magnetic head 10.

Figure 25:
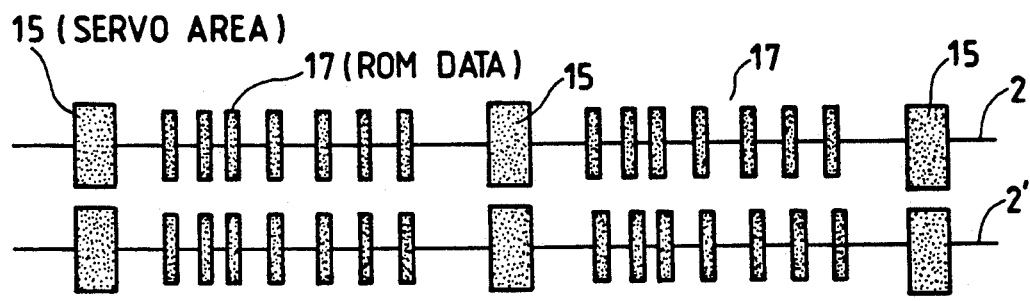
FIGS. 25 and 26 show an example of read-only tracks in the ROM area, respectively.

FIG. 25 shows the data read-only track inside the ROM area 39 described above. In FIG. 25, each data track 2, 2' consists of the combination of a large number of servo areas 15 disposed periodically along the track and the read-only ROM data (e.g. code data) 17 disposed between these servo areas 15. As described above, each of the servo area 15 and ROM data 17 is composed of the preformed pits formed by locally etching and removing the magnetic film and having the different magnetic characteristics from those of the recording magnetic film, for example, as described already. The tracking signal is obtained by sampling and detecting magnetically the magnetic field generated at the edges of the preformed pits in these servo areas 15 and while the magnetic head is being subjected to the servo position control on the basis of the tracking signal, the ROM data 17 between the servo areas 15 are read along the center line of the tracks 2, 2'. The ROM data 17 are only read by the magnetic head but area not recorded by the magnetic head.

Figure 26:
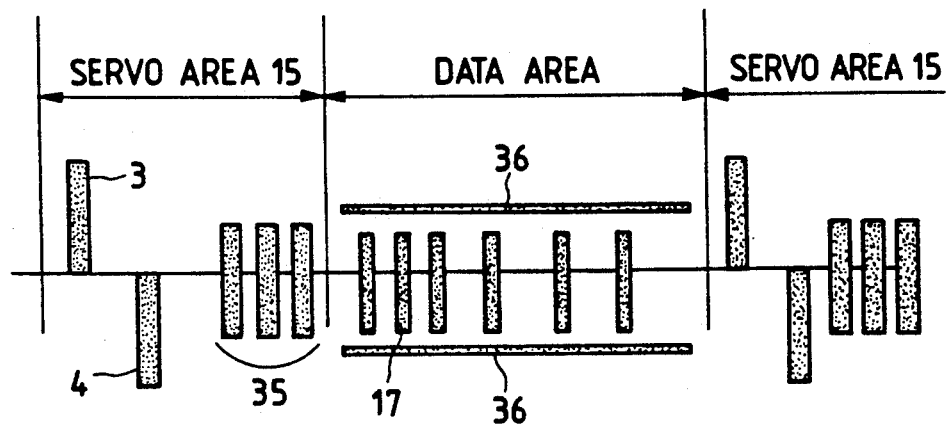

FIG. 26 shows an example of the recording tracks in the ROM area 39. The preformed pits 3, 4, 35 in the servo area 15 and the grooves 36 between the tracks in the data area are the same as those shown in FIG. 24. The pits 17 in the data area are preformed by the same method as that for the preformed pits 3, 4, 35 in the servo area, in the ROM area 39.

In other words, in the ROM area 39, the pits in the servo area and the ROM data 17 in the data area are formed by locally etching and removing the recording film, for example. The tracking signal is obtained by magnetically sampling and detecting the magnetic field generated at the edges of each performed pit in these servo areas and while the magnetic head is being subjected to the servo position control on the basis of the tracking signal, the ROM data 17 inside the data areas between the servo areas are read along the center line of the track.

This embodiment can economically duplicate and record the ROM data into the magnetic recording medium and moreover, since the ROM data and the RAM data exist in mixture, the embodiment can save the trouble of copying the software to the magnetic recording medium by use of a floppy because a software program or the like can in advance been formed as the ROM data in the magnetic recording medium when it is used in an apparatus such as a personal computer.

If a large number of servo areas are in advance provided periodically in the first areas (ROM areas) and in the second areas (RAM areas), the data can be recorded to and read from the second areas (RAM areas) or can be read out from the first area (ROM areas) by magnetically detecting the flux distribution occurring at each performed pit of the servo areas by the magnetic head and making the servo position control.

What is claimed is:

1. A method of recording and reading data comprising:
   using a magnetic recording medium having a magnetic film storing data in such a form as to be capable of recording and reading magnetically the data and equipped with a plurality of servo areas for detecting tracking signals, disposed periodically along tracks and with a plurality of servo pits preformed in each of said servo areas and having magnetic characteristics different from those of said magnetic film;
   magnetically the magnetic film in a direction of data recording;
   detecting the magnetic field occurring at edges of each of said preformed servo pits when a magnetic head scans each of said servo areas to obtain said tracking signals; and
   recording or reading said data, by said magnetic head, between said servo areas while making tracking control on the basis of said tracking signals with said magnetic head moving along the center of said tracks;
   wherein said magnetic recording medium is a magnetic recording medium whose preformed servo pits are formed by removing a base film below said magnetic film.

2. A magnetic recording medium having a ferromagnetic recording film to which magnetically readable data are recorded, wherein servo areas for detecting tracking signals are periodically provided along tracks and each of said servo areas has preformed servo pits having different magnetic characteristics from those of said magnetic film, and a groove being provided between said tracks, wherein said preformed servo pits in each of said servo areas are formed by removing a base film below said magnetic film.

3. A method of producing a magnetic recording medium having a ferromagnetic recording film to which magnetically readable data are recorded, wherein servo areas for detecting tracking signals are periodically provided along tracks and each of said servo areas has preformed servo pits having different characteristics from those of said magnetic film, said method comprising the steps of:
   preparing a mask having patterns of servo pits to be provided in advance in said servo areas using an elongated shape laser beam spot;
   exposing a resist disposed on said magnetic film through said mask; and
   removing said resist corresponding to said patterns;
   wherein said servo pits are preformed by removing locally a base film below said magnetic film corresponding to said patterns.

4. A method of recording and reading data comprising:
   using a magnetic recording medium including a substrate having preformed pits thereon and a magnetic film storing data in such a form as to be capable of recording and reading magnetically the data, the magnetic film overlying a surface of the substrate including the preformed pits;
   magnetizing the magnetic film in a direction of data recording;
   detecting the magnetic field occurring at edges of each of the preformed pits when a magnetic head scans the magnetic recording medium to obtain a control signal; and
   recording or reading data, by the magnetic head on the basis of the control signal.

5. A method according to claim 4, wherein at least portions of the magnetic film overlying preformed pits have magnetic characteristics different from other portions of the magnetic film overlying the surface of the substrate without overlying the preformed pits.

6. A method according to claim 5, wherein the substrate is made by a replication process.

7. A method according to claim 5, wherein the magnetic recording medium includes a base film interposed between the magnetic film and the surface of the substrate only at the portions of the magnetic film overlying the surface of the substrate without overlying the preformed pits.

8. A method according to claim 5, wherein the magnetic film overlies the entire surface of the substrate including the preformed pits.

9. A method according to claim 5, wherein the preformed pits are disposed periodically along tracks in servo areas for detecting tracking signals and the magnetic field occurring at edges of each of the preformed pits is detected when the magnetic head scans each of the servo areas to obtain a tracking signal as the control signal, the step of recording or reading data including recording or reading data by the magnetic head between the servo areas while making tracking control on the basis of the tracking signal with the magnetic head moving along the center of the tracks.

10. A method of recording and reading data according to claim 9, wherein said magnetic recording medium is a magnetic recording medium wherein said preformed servo pits in each of said servo areas consists of at least one pair of wobbled servo pits provided in a wobbling arrangement with respect to the center of said track, and said tracking signal is detected from the difference of the outputs obtained by detecting the magnetic field occurring at each of said wobbled servo pits by said magnetic head.

11. A method of recording and reading data according to claim 9, wherein said magnetic recording medium is magnetic recording medium wherein said preformed servo pits in each of said servo areas consists of a set of bit trains having mutually different frequencies, components having said mutually different frequencies are detected from outputs obtained by scanning said set of pit lines by said magnetic head and said tracking signal is detected from the difference of the signals thus detected.

12. A method of recording and reading data according to claim 9, wherein said magnetic recording medium is magnetic recording medium including first areas having preformed data pits having different magnetic characteristics from those of said magnetic film between said servo areas and second areas having recording areas between said servo areas, said recording areas being capable of recording data using said magnetic head, and said data pits are read by detecting the magnetic field occurring at said preformed data pits by said magnetic head.

13. A method of recording and reading data according to claim 9, wherein the length of said preformed servo pit in a direction at right angles to said track is substantially equal to that of the recording portion of said magnetic head.

14. A method according to claim 9, wherein the preformed servo pits are of circular or rectangular shape.

15. A magnetic recording medium comprising a substrate having preformed pits therein and a magnetic film overlying a surface of the substrate including the pits preformed therein so as to enable a magnetic field occurring at edges of each of the preformed pits to be detected by a magnetic head scanning the magnetic recording medium.

16. A magnetic recording medium according to claim 15, wherein at least portions of the magnetic film overlying preformed pits have magnetic characteristics different from other portions of the magnetic film overlying the surface of the substrate without overlying the preformed pits.

17. A magnetic recording medium according to claim 16, wherein the magnetic film stores data in such a form as to be capable of recording and reading magnetically the data, the preformed pits being disposed periodically along tracks in servo areas for detecting tracking signals, the preformed pits in the servo areas being servo pits.

18. A magnetic recording medium according to claim 17, wherein said preformed servo pits in each of said servo areas consist of at least a pair of wobbled servo pits provided in a wobbling arrangement with respect to the center of said track.

19. A magnetic recording medium according to claim 17, wherein said preformed servo pits in each of said servo areas consist of one set of pit lines having mutually different frequencies.

20. A magnetic recording medium according to claim 17, which includes first areas having preformed data pits having different magnetic characteristics from those of said magnetic film between said servo areas and second areas having recording areas to which data can be recorded by a magnetic head between said servo areas.

21. A magnetic recording medium according to claim 17, wherein a groove is provided between said tracks.

22. A magnetic recording medium according to claim 16, wherein a base film is interposed between the surface of the substrate and the magnetic film only at the portion of the magnetic film overlying the surface of the substrate without overlying the preformed pits.

23. A magnetic recording medium according to claim 16, wherein the magnetic film overlies the entire surface of the substrate including the preformed pits.

* * * * *